United States Patent [19]

Fossati et al.

[11] Patent Number: 4,484,322
[45] Date of Patent: Nov. 20, 1984

[54] CIRCUIT ARRANGEMENT FOR SUPPRESSING OUTGOING-SIGNAL NOISES IN SYSTEM FOR BIDIRECTIONAL TRANSMISSION OF DIGITIZED SIGNALS OVER TWO-WIRE LINE

[75] Inventors: Roberto Fossati, Turin; Vincenzo Lazzari, Leini-Torino, both of Italy

[73] Assignee: Cselt Centro Studi E Laboratori Telecomunicazioni S.p.A., Turin, Italy

[21] Appl. No.: 562,997

[22] Filed: Dec. 16, 1983

Related U.S. Application Data

[63] Continuation of Ser. No. 356,259, Mar. 8, 1982, abandoned.

[30] Foreign Application Priority Data

Mar. 9, 1981 [IT] Italy .................. 67323 A/81

[51] Int. Cl.³ .................. H04L 5/14; H04M 1/20; H04M 7/10
[52] U.S. Cl. .................. 370/32; 370/24; 179/170.2
[58] Field of Search .................. 370/24, 27, 32; 179/170.2, 170.6

[56] References Cited

U.S. PATENT DOCUMENTS

| 4,064,378 | 12/1977 | Kitayama et al. | 179/170.2 |
| 4,237,463 | 12/1980 | Bjor et al. | 370/27 |
| 4,263,668 | 4/1981 | Haass | 370/24 |
| 4,393,494 | 7/1983 | Belforte et al. | 370/32 |

FOREIGN PATENT DOCUMENTS 161638  2/1980  Netherlands .................. 179/170.2

OTHER PUBLICATIONS

N. Holte & S. Stueflotten, "A New Digital Echo Canceler For Two-Wire Subscriber Lines", pp. 45.31–45.37, (Conf. Rec. NTC '80, Houston, Nov. 30–Dec. 4, 1980).

*Primary Examiner*—Douglas W. Olms
*Assistant Examiner*—Frank M. Scotch, III
*Attorney, Agent, or Firm*—Karl F. Ross; Herbert Dubno

[57] ABSTRACT

In order to suppress noise due to reflected outgoing signals in a telephone receiver of a system for the bidirectional transmission of digitized voice signals over a two-wire telephone line connected by a hybrid coil to an outgoing section and an incoming section of a subscriber station or of an exchange, a shift register loaded with several (e.g. five) consecutive transmitted bits from the outgoing section addresses the cells of a memory containing the digitized amplitudes of corrective signals assigned to the several bit combinations which may be present at any time in that register. The corrective signal read out from the memory during each bit period is subtracted in the incoming section from an arriving signal and the result is fed on the one hand to a receiver and on the other hand to an algebraic adder as a modifying signal incrementing or decrementing, if need be, the contents of the corresponding cell during a writing interval which is a small fraction of a bit period. As the arriving signals are digitized with a balanced code (e.g. AMI), their presence does not significantly affect the magnitude of the modifying signal emitted by the adder. If this circuit arrangement is part of a subscriber station, all active components are timed by clock pulses extracted from the incoming bit stream; if it is part of an exchange, only the receiving section is controlled by extracted clock pulses while the reading and writing in the memory is controlled by pulses from a master clock, divergences between the two clock-pulse trains being compensated by the introduction of delays under the control of a coincidence circuit.

8 Claims, 3 Drawing Figures

CIRCUIT ARRANGEMENT FOR SUPPRESSING OUTGOING-SIGNAL NOISES IN SYSTEM FOR BIDIRECTIONAL TRANSMISSION OF DIGITIZED SIGNALS OVER TWO-WIRE LINE

This application is a continuation of application Ser. No. 356,259 filed Mar. 8, 1982, now abandoned.

FIELD OF THE INVENTION

Our present invention relates to a circuit arrangement designed to suppress noises due to reflected outgoing signals in a telecommunication—especially telephone—system in which digitized signals are transmitted in two directions over a two-wire line.

BACKGROUND OF THE INVENTION

The advent of inexpensive integrated circuitry has facilitated the conversion of analog voice and data signals into digitized samples, generally in a PCM mode, as well as the reconversion of such samples into analog signals. Converters of this type can therefore now be installed directly in a telephone subscriber's apparatus so as to allow the transmission of digital signals between a subscriber station and a central office or exchange, with resulting improvement in signal quality and a more extended use of a telephone line for additional services such as data transmission.

A convenient path for the bidirectional transmission of digital signals would be a 4-wire line, with respective wire pairs available for incoming and outgoing signals. Since, however, in existing telephone networks an exchange is generally linked with associated subscriber stations by 2-wire lines, their replacement with 4-wire transmission links would be prohibitively expensive.

When a 2-wire line is to be used for bidirectional transmission of digitized signals, incoming and outgoing samples may be alternately sent over the line in the form of respective binary sequences separated by a guard interval within a PCM frame. This would require an approximate doubling of the bit rate and a corresponding increase in bandwidth if the number of intercommunicating channels is to be preserved. Since the usual subscriber lines can operate only with limited bandwidth, this method is also not very practical.

Conventional duplexing terminals, using hybrid coils, enable the simultaneous transmission of analog signals in two directions over a single 2-wire loop. With digitized samples, however, the effect of echoes of outgoing signals upon incoming signals is more serious, such echoes being almost unavoidably caused by imperfect impedance matching between the line and the balancing load of the hybrid coil as well as by reflections at parallel stubs adjoining the line. Prior proposals for minimizing these echoes call for a repetitive evaluation of the noise during a given bit period for the generation of corrective signals by relatively costly recursive filtering.

In commonly owned application Ser. No. 193,009, now U.S. Pat. No. 4,393,494, filed Oct. 2, 1980 by Piero Belforte et al, there has been disclosed a transceiver for full-duplex transmission of digital signals over a line with not more than two wires. While that transceiver constitutes a significant improvement over the conventional hybrid-coil termination, its implementation is still somewhat expensive if echo noises are to be fully suppressed.

OBJECT OF THE INVENTION

The object of our present invention, therefore, is to provide an improved circuit arrangement for the purpose set forth which allows the use of existing subscriber lines for bidirectional digital transmission without the need for complex processing of noise levels.

SUMMARY OF THE INVENTION

Our present improvement is particularly designed for a telecommunication system in which a station, which could be that of a subscriber but could also be an automatic or semiautomatic exchange, is linked with a remote communicator via a two-wire line carrying voice samples that are digitized with a three-level bipolar code of the NRZI (Non-Return-to-Zero with Inversion) type. A typical code of this character is known under the designation AMI, for "alternate mark inversion"; such a code does not include any d-c component. The station has an outgoing branch provided with a signal transmitter and an incoming branch provided with a signal receiver, both of them connected to the two-wire line through a duplexing terminal which could be a hybrid coil but may also be a transceiver of the type described in commonly owned, now U.S. Pat. No. 4,393,494. Voice samples generated by the transmitter are converted, under the control of timing means, into code words with a multiplicity of three-level bits or symbols traversing the outgoing branch in successive bit periods over time slots assigned to a code word. A shift register with n stages in the outgoing branch, also controlled by the timing means, contains up to n such three-level bits in respective stages during each bit period. These stages are connected to address inputs of a random-access memory which has $2^{n+1}$ cells addressable by as many symbol combinations present in the shift register, this memory further having a data input and a data output for loading an addressed cell in response to a writing command and extracting its contents in response to a reading command from the timing means. The incoming branch includes arithmetic means also controlled by the timing means and connected to both the data output and the data input of the memory for comparing the contents of an addressed cell during a reading phase of a bit period with a noise signal from the duplexing terminal, generated by a concurrently transmitted voice sample, and for deriving frojm the result of the comparison a corrective signal which is entered in the same cell during a writing phase of the current bit period. A subtractor forming part of the arithmetic means delivers to the receiver a purged sample which corresponds to the difference between a noise-contaminated incoming voice sample and the aforementioned corrective signal.

According to a more particular feature of our invention, the subtractor has respective inputs connected to the data output of the memory and to the duplexing terminal, an output of this subtractor being connected to the one hand to the receiver and on the other hand to a first input of an algebraic adder which also forms part of the arithmetic means and receives on that first input an updating signal derived from the purged sample; the adder has a second input connected to the data output of the memory and has its output connected to the data input thereof. The connection between the subtractor output and the first adder input preferably includes a buffer store controlled by the timing means for delaying the transmission of the updating signal to the adder during part of a reading phase and thus by a fraction of a bit period. This delay, designed to insure that the updating signal is generated on the basis of the same corrective signal which the memory supplies to both the subtractor and the adder, should of course end before the emission of a writing command by the timing means. The updating signal, whose generation is tied to the arrival of a new signal on the incoming branch, must not be changed during a writing phase so as not to give rise to errors in the modification of the corrective signal then read out from the memory. Such a problem will not arise if the transmitter, the shift register and the updating circuitry are all controlled by clock pulses from a common timer, e.g. in a subscriber station in which the source of these clock pulses is responsive to synchronizing bits accompanying incoming voice samples. If, however, the station here considered is part of an exchange, the generation of outgoing voice samples and of the write/read commands is preferably controlled by a local time base or master clock whose pulses may not be in step with those of another clock controlling the updating circuitry and the signal receiver in response to extracted synchronizing bits. In such a case, therefore, we prefer to provide inhibiting means for terminating a writing phase whenever a comparator detects a coincidence between the arrival of a new incoming voice sample, accompanied by a synchronizing bit, and a writing command emitted by the local clock.

In any event, the writing phase should be only a minor fraction of a bit period in order to permit full development of the updating signal.

In general, noise due to reflection of outgoing signals has only a minor effect if it is delayed by more than a bit period since the line attenuation will reduce it progressively with travel time; thus, a transmission rate of 80 kbit/sec as here specifically contemplated corresponds to a bit period of 12.5 μs during which the noise signal will have traveled 2.5 km, assuming a propagation speed of 5 μs/km along the line. With n bits or symbols present in the stages of the shift register during a given bit period, and with the contribution of each to the noise level present at the input end of the incoming branch designed $\alpha_j$, that noise level $D_n$ may be given by $$D_n = \sum_{j=0}^{k} \alpha_j T_{n-j}$$

where $T_{n-j}$ is the logical value of each symbol which in the case of an AMI code will be $+1, 0$ or $-1$. We have found that the foregoing formula yields satisfactory results with $k \leq 4$, i.e. with $n=5$.

BRIEF DESCRIPTION OF THE DRAWING

The above and other features of our invention will now be described in detail with reference to the accompanying drawing in which.

SPECIFIC DESCRIPTION

Figure 1:
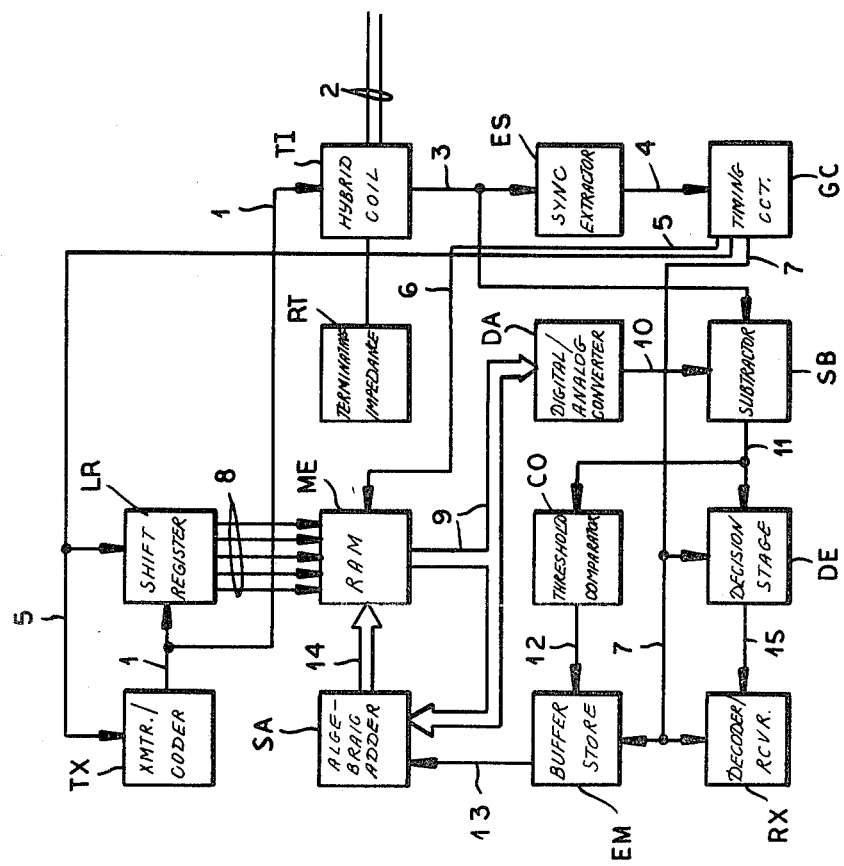
FIG. 1 is a block diagram of a subscriber station provided with echo-suppressing circuitry according to our invention.

In FIG. 1 we have shown a subscriber station of a telephone network connected via a two-wire line 2 to a remote communicator, such as an exchange or another subscriber. The station has an outgoing branch 1 and an incoming branch 3 coupled with line 2 by a duplexer TI, specifically a hybrid coil. A voice transmitter TX, which also includes a coder converting outgoing voice samples into digital AMI symbols, has its output connected directly to hybrid coil TI and in parallel therewith to a five-stage shift register LR whose stage outputs are connected by a multiple 8 to respective address inputs of a random-access memory ME. The usual line-terminating impedance is shown at RT.

With up to five symbols stored at a given instant in shift register LR, there are 64 possible bit combinations or address codes corresponding to as many corrective values since any signal amplitude may be represented in the AMI code by either of two bit combinations whose first bit of logical value "1" is positive in one combination and negative in the other. Thus, memory ME has 64 cells each addressable by a respective symbol combination.

Since the last bit loaded into shift register LR by transmitter TX is the one concurrently sent out over line 2, it will make the greatest contribution to the noise simultaneously appearing in the receiving branch 3 if its magnitude is other than zero. The contributions from the remaining bits previously loaded into that register will only be due to reflections from points farther down the line and will progressively diminish; thus, as noted above, there will generally be no need for storing more than five symbols in the register. The relative magnitudes of the corrective signals contained in the several memory cells will therefore generally correspond to those of the respective five-bit address codes in which the most significant bits are those last entered into the shift register.

It will be assumed, for purposes of this description, that the digital AMI-type samples are transmitted and received at the aforementioned rate of 80 kbit/sec, with ten bits constituting a recurrent frame consisting of one synchronizing bit, one data bit and eight voice bits. The line therefore can carry a data channel of 8 kbit/sec in addition to a PCM voice channel of 64 kbit/sec in each direction.

Figure 3:
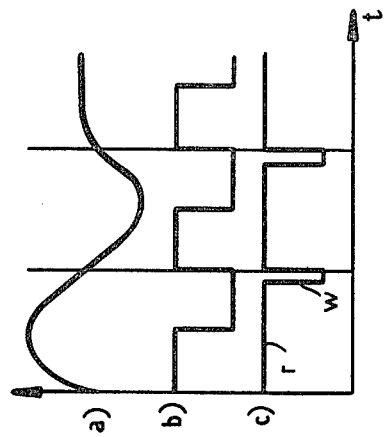
FIG. 3 is a set of graphs relating to the operation of that circuitry.

The synchronizing bit arriving from the remote station is detected by an extractor ES which, via a lead 4, controls the operation of a timing circuit GC having output leads 5, 6 and 7. Lead 5 carries a train of clock pulses controlling the coder in transmitter TX and advancing the shift register LR at a rate of one step per bit period. This synchronizing bit is illustrated in graph a of FIG. 3 as the first (positive) peak of an incoming signal wave. Graph b of FIG. 3 shows the clock pulses generated on lead 5 whereas graph c illustrates an alternation of reading commands r and writing commands w emitted on lead 6 to a control input of memory ME. It will be noted that the reading command r lasts for a major part of a clock cycle while the writing command w is present only for a fractional period at the end of each cycle.

Incoming branch 3 is connected to a subtractor SB which also receives on another input a corrective signal concurrently read out from the addressed cell of memory ME on a multiple 9 and changed to analog form by a converter DA. Subtractor SB feeds the difference between the noise-contaminated incoming signal on lead 3 and the corrective signal on lead 10 via a lead 11 to a decision stage DE and in parallel therewith to a threshold comparator CO. An output lead 15 of decision stage DE extends to a receiver RX provided with a decoder which converts the incoming eight-bit voice codes into amplitude samples which are integrated and fed to the subscriber's earpiece in the usual manner. Threshold comparator CO derives from a non-zero output signal of subtractor SB an updating bit of corresponding polarity delivered via a lead 12 to a buffer store EM from which that bit is subsequently fed, during the same clock cycle and before the generation of writing command w, to an algebraic adder SA also receiving the corrective signal read out from memory ME on multiple 9. The corrective signal, consisting of five amplitude bits and one sign bit, is incremented or decremented in adder SA by one unity value and is then re-entered via a multiple 14, during the writing phase, in the same cell from which it was read out and which is still being addressed by the symbol combination present in shift register LR. Components DE, RX and EM are controlled by clock pulses emitted from circuit GC on lead 7.

If no incoming signals are received over line 2, branch 3 will carry only the noise due to outgoing signals which wil initially pass the subtractor SB unchanged and will give rise to digital signals written by adder SA in corresponding memory cells. The initial contents of these cells will therefore be progressively modified so that the output of subtractor SB will tend toward zero. When an incoming signal appears, subtractor SB will have a non-zero output which, however, will affect only the least-significant amplitude bit of the corrective signal stored in the corresponding cell; since consecutive non-zero bits of an incoming message alternate in polarity, the average modification of the contents of memory ME by these incoming signals will be zero and the actual value of any corrective signal read out from the memory will fluctuate only slightly.

Figure 2:
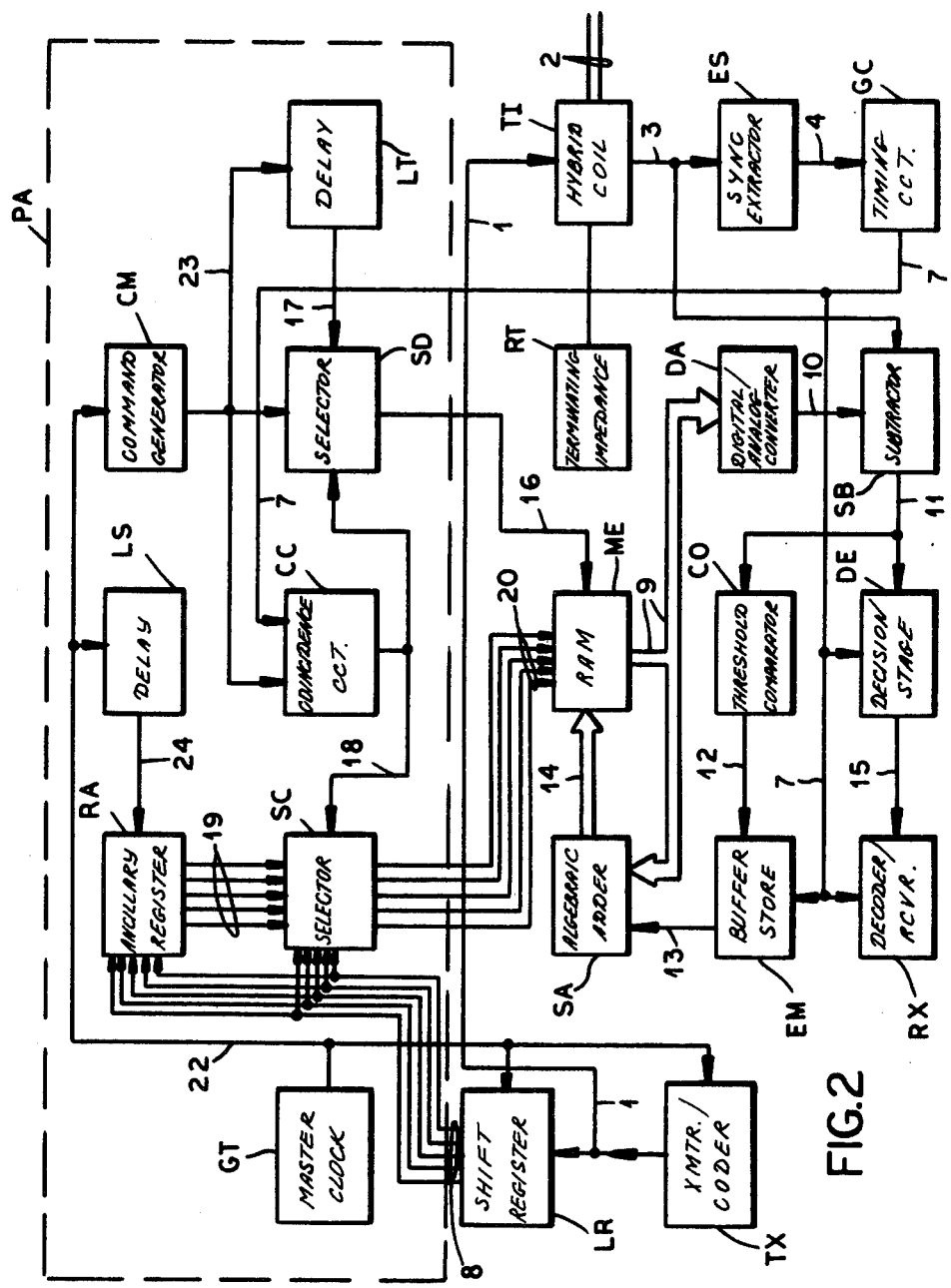
FIG. 2 is a similar block diagram representing a telephone exchange equipped with such circuitry.

Reference will now be made to FIG. 2 which shows a station similar to that of FIG. 1 but forming part of a telephone exchange. This circuitry includes the same components as that of FIG. 1, except for the omission of output leads 5 and 6 of timing circuit GC which therefore controls only the decision stage DE, the decoder of receiver RX and the buffer store EM all forming part of the receiving section of the station. An additional section PA of the exchange includes a master clock GT with an output lead 22 delivering clock pulses to the coder of transmitter TX, to the stepping input of shift register LR, to a delay line LS, and to a command generator CM controlling the reading and writing in memory ME via an output lead 23, a selector SD and another lead 16. Section PA further comprises, in addition to the components just referred to, an ancillary register RA with a control input connected by a lead 24 to delay circuit LS and with five loading inputs connected to respective leads of multiple 8 originating at the stage outputs of shift register LR, the latter leads being also connected to corresponding inputs of a selector SC which has another set of inputs connected via a multiple 19 to stage outputs of register RA. An output multiple 20 of selector SC extends to the address inputs of memory ME which receives the contents of register LR in a normal position of that selector in which the output lead 23 of command generator CM is also connected to lead 16. Selectors SC and SD, which may be designed as multiplexers, are each switchable to an alternate position by a signal on an output lead 18 of a coincidence circuit CC whose inputs are connected to lead 23 and to the output lead 7 of timing circuit GC. A further delay circuit LT, similar to circuit LS, is inserted between a branch of lead 23 and a lead 17 extending to another input of selector SD.

As long as the two timers GT and GC are substantially in step with each other, a writing command will be emitted by generator CM somewhat before the end of a cycle of the incoming bit stream so that the loading of buffer store EM with an updating bit will take place in the latter part of a reading phase as in the operation described with reference to FIG. 1. In that case the coincidence circuit CC will have no output so that selectors SC and SD are in their normal positions. If, however, a timing pulse on lead 7 coincides with a writing command on lead 23 so that the updated code produced by adder SA could be modified during a writing phase, comparator CC switches the selectors SC and SD so that memory ME again receives on lead 16 the reading command previously stored in delay circuit LT while its address outputs continue to receive the same code as before by way of ancillary register RA and selector SC even though the transmitter TX may have emitted a new bit in the interim. When circuit CC no longer detects such a coincidence, normal operation is resumed.

In both FIG. 1 and FIG. 2 we may replace the digital-/analog converter DA in the connection between memory ME and subtractor SB by an analog/digital converter inserted between hybrid coil TI and the subtractor so that the latter will operate on digital rather than analog signals.

We claim:

1. In a telephone station having an outgoing branch provided with a signal transmitter and an incoming branch provided with a signal receiver connected via a duplexing terminal to a two-wire line for exchanging voice samples with a remote communicator, said voice samples being digitized with a three-level bipolar NRZI-type code, the combination therewith of a circuit arrangement for suppressing in said incoming branch noises due to outgoing voice samples imperfectly balanced out by said duplexing terminal, comprising:

timing means controlling the conversion of voice samples generated by said transmitter into code words with a multiplicity of three-level bits traversing said outgoing branch in successive bit periods of a time slot assigned to a code word;

a shift register with n stages in said outgoing branch controlled by said timing means for containing up to n three-level bits in respective stages during each bit period;

a random-access memory with address inputs connected to said stages and with $2^{n+1}$ cells addressable by as many combinations of three-level bits in said input and a data output for loading an addressed cell in response to a writing command and extracting the contents thereof in response to a reading commend from said timing means; and arithmetic means in said incoming branch controlled by said timing means and connected to said data output and to said data input for comparing the contents of an addressed cell during a reading phase of a bit period with a noise signal from said duplexing terminal due to a concurrently transmitted voice sample and for deriving from the result of comparison a corrective signal entered in the same cell during a writing phase of such bit period, said arithmetic means including a subtractor delivering to said receiver a purged sample corresponding to the difference between a noise-contaminated incoming voice sample and said corrective signal, said subtractor having respective inputs connected to said data output and to said duplexing terminal, said arithmetic means further comprising an algebraic adder having a first input connected in parallel with said receiver to an output of said subtractor for receiving an updating signal derived from said purged sample and having a second input connected to said data output, said adder having an output connected to said data input, said timing means comprising a clock circuit responsive to synchronizing bits accompanying incoming voice samples, said clock circuit generating timing pulses controlling at least the loading of said adder with said updating signal during a reading phase of a bit period.

2. The combination defined in claim 1, further comprising a buffer store controlled by said timing means and inserted between said subtractor and said first input for delaying the transmission of said updating signal to said adder during part of a reading phase.

3. The combination defined in claim 2, further comprising a threshold comparator interposed between said subtractor and said buffer store for generating said updating signal as a bit of a polarity determined by the sign of said difference upon the latter exceeding a predetermined absolute value.

4. The combination defined in claim 3 wherein said receiver includes a decoder for converting incoming digitized voice samples into analog voltages, further comprising a digital/analog converter inserted between said data output and said subtractor.

5. The combination defined in claim 4, further comprising a decision stage interposed in said incoming branch between said subtractor and said receiver.

6. The combination defined in claim 1 wherein said timing means further comprises a local time base establishing said bit periods and emitting said reading and writing commands, comparison means connected to said clock circuit and to said time base for detecting a coincidence of the arrival of a new loading-control pulse with a writing phase of a bit period, and inhibiting means controlled by said comparison means for terminating said writing phase in response to such coincidence.

7. The combination defined in claim 1 wherein said writing phase is a minor fraction of a bit period.

8. The combination defined in claim 1 wherein $n=5$.

* * * * *